US008851037B2

(12) United States Patent
Mininni et al.

(10) Patent No.: US 8,851,037 B2
(45) Date of Patent: Oct. 7, 2014

(54) TWO AND THREE PIECE, T6 BULLET TIMING CHAIN COVER AND NEEDLE BEARING IDLER SPROCKET, FOR DART ENGINEERING ENGINE BLOCKS WITH CAM SHAFT .600 THOUSANDTHS HIGHER FROM STOCK LOCATION WITH REMOVABLE UPPER HALF

(75) Inventors: Dominick Joseph Mininni, Anthem, AZ (US); Mary Elizabeth Mininni, Anthem, AZ (US)

(73) Assignees: Dominick J. Mininni, Anthem, AZ (US); Mary Elizabeth Mininni, Anthem, AZ (US)

( * ) Notice: Subject to any disclaimer, the term of this patent is extended or adjusted under 35 U.S.C. 154(b) by 0 days.

(21) Appl. No.: 13/573,316

(22) Filed: Sep. 10, 2012

(65) Prior Publication Data

US 2013/0092120 A1   Apr. 18, 2013

Related U.S. Application Data

(60) Provisional application No. 61/627,724, filed on Oct. 18, 2011.

(51) Int. Cl.
| F01M 9/10 | (2006.01) |
| F02B 77/00 | (2006.01) |
| F02B 67/00 | (2006.01) |
| F02B 77/04 | (2006.01) |
| F16G 13/06 | (2006.01) |
| F02F 7/00 | (2006.01) |

(52) U.S. Cl.
CPC ............... *F02B 77/00* (2013.01); *F16G 13/06* (2013.01); *F02F 7/00* (2013.01)
USPC ............... 123/90.37; 123/195 C; 123/195 A; 123/198 E

(58) Field of Classification Search
USPC .................... 123/90.37, 195 C, 195 A, 198 E
See application file for complete search history.

(56) References Cited

U.S. PATENT DOCUMENTS

| 4,261,310 | A | * | 4/1981 | Laws, Jr. .................... 123/198 E |
| 4,867,335 | A | * | 9/1989 | Segal .............................. 220/327 |
| 5,645,024 | A | * | 7/1997 | Allen et al. ................. 123/90.38 |
| 5,851,313 | A | * | 12/1998 | Milam ........................... 148/222 |
| 6,325,033 | B1 | * | 12/2001 | Iwata .......................... 123/90.31 |
| 6,752,119 | B2 | * | 6/2004 | Coleman ................... 123/195 C |
| 7,171,939 | B1 | * | 2/2007 | Tiller .......................... 123/196 R |
| 7,194,994 | B1 | * | 3/2007 | Chisenhall et al. ........ 123/195 A |
| 2005/0016490 | A1 | * | 1/2005 | Stone ......................... 123/195 A |
| 2006/0185427 | A1 | * | 8/2006 | Ono et al. ..................... 73/118.1 |

* cited by examiner

*Primary Examiner* — Lindsay Low
*Assistant Examiner* — Charles Brauch

(57) ABSTRACT

The two and three piece bullet aluminum timing chain cover with removable upper half and adjustable needle bearing idler sprocket is a unique non-conventional timing chain cover and sprocket combination that utilizes a sprocket to allow a longer chain to be used for the additional height separation from crank center to cam center line. It takes up timing chain slack or excessive side play within the chain, and allows it to be mounted and assembled on Dart engineering Chevy Engine Blocks part numbers 31282465 through 31293875.

2 Claims, 7 Drawing Sheets

TWO AND THREE PIECE, T6 BULLET TIMING CHAIN COVER AND NEEDLE BEARING IDLER SPROCKET, FOR DART ENGINEERING ENGINE BLOCKS WITH CAM SHAFT .600 THOUSANDTHS HIGHER FROM STOCK LOCATION WITH REMOVABLE UPPER HALF

CROSS REFERENCE

This application claims priority to U.S. Patent Application No. 61/627,724 filed Oct. 18, 2011 the specification(s) of which is/are incorporated herein in their entirety by reference.

DESCRIPTION OF THE INVENTION

Two and three piece T6 bullet aluminum timing chain cover with removable upper half and adjustable needle bearing idler sprocket for high performance Dart engineering custom Chevy engine blocks with cam shaft raised 0.600 thousandths of an inch higher from stock location. The unique part of this invention is the custom designed cover, the modified idler sprocket with hardened shaft and bearing race for high rpm needle bearing. The next part of this system involves a timing chain that's been modified and extended to a custom length.

Process of Making the Invention

The process of making the cover involves using two pieces of flat plate T6 aluminum, $1^{st}$ plate thickness 0.250 thousandths of an inch, which is front cover. $2^{nd}$ plate thickness which is 0.750 thousandths of an inch, which is the backing plate. These are cut to precision and exact specifications with water jet machining process. The next part of the process is modifying a Martin sprocket DO-6B-15 to bore size 0.874 thousands of an inch. Then press-fitting a caged needle bearing part number JH-1016-HO into the sprocket. The next part of the process is utilizing two inner bearing races part number RIB 68-1 mounted on a hardened ARP shaft, part number AJ-2.500-1B modified length to 2.150 inches. The hardened shaft is then mounted to the front timing cover, and is adjustable by re-positioning the shaft to 0.010 to 0.030 thousandths of an inch allowing the idler sprocket to take up excessive chain slack. The idler sprocket then rotates freely on the bearing and race. The purpose of the idler sprocket is to allow the use of a longer timing chain due to the fact that the cam center position has been raised 0.600 thousandths of an inch higher from the stock location on a dart engine block part number 31282465 thru 31293875, (Stock location is 5.152 thousandths of an inch from crankshaft center to camshaft center). Total cam center to crank center distance is now 5.752 thousandths of an inch. So we then take a Cloyes double roller link chain 0.250 thousandths of an inch roller diameter and add additional links to make it a 70 link chain to work with our timing cover system.

BACKGROUND OF THE INVENTION

Being an automotive technician/engineer, and being in the sport of drag racing for many years, I have built many different types of automotive engines and always have used a timing chain and sprocket system. Upon purchasing a modified Dart machined engine block with the cam shaft raised 0.600 thousandths of an inch from the stock location; there was no timing chain and sprocket assembly available for this modified engine block 31282465 through 31293875. At that time, the only thing that was available was a timing belt system that was expensive to purchase, and the belt would eventually wear and break. The belt would be exposed to the outside elements, like dust, dirt, pebbles and debris, and would wind up wearing down quickly, causing the belt to break, and break down causing severe engine damage. So I got the idea to develop and create a timing chain and cover system that would work on this engine, completely sealed and lubricated. It took roughly 3-5 months to create a prototype and two years to modify and adjust minor technical issues with the system. The actual timing chain and cam sprocket and crank sprocket are a division of Cloyes engineering system. The idler sprocket is a division of Martin Engineering, and has been highly modified for the use with this system. So we designed and built a cover that would fit the Dart engineering Chevy Big M block with cam shaft raised 0.600 thousandths of an inch higher from stock location. I utilized the Cloyes cam and crank sprockets and timing chain, which has been modified and extended with a total of 70 chain links. We have also highly modified a Martin Engineering sprocket in this system, by boring out the center diameter to 0.874 thousandths of an inch diameter and inserting an encaged needle bearing, and also modified oil flow through the sprocket.

This cover will only fit and work with a Dart engineering Chevy block with cam raised 0.600 thousandths of an inch from stock location, part number's 31282465 through 31293875. It is one of a kind, and it's been in progress for over 5 years, and finally developed. It's been in testing for 4 years and ready for marketing, and is an alternative to a belt drive system. The benefits to this system are it is more cost effective, less expensive for motor sports enthusiasts who build their own race engines, and the chain and sprocket are more durable and are lubricated within the engine and have longer life expectancy.

Uses for the Invention

Its uses are for drag racing motors, sand drag motor sports, tractor pull motor sports, and drag boat racing. This system is completely sealed when the front cover is placed on and is lubricated by oil from within the engine, and completely protected from all external debris, dust, etc.

It's a unique non-conventional timing chain cover and sprocket combination that utilizes a modified idler sprocket to allow a longer chain to be used for the additional height separation from crank center to cam center line. It takes up timing chain slack or excessive side play within the chain. This system is used as an alternative to a belt drive system on the Dart Engineering block part numbers 31282465 through 31293875.

Figure 1:
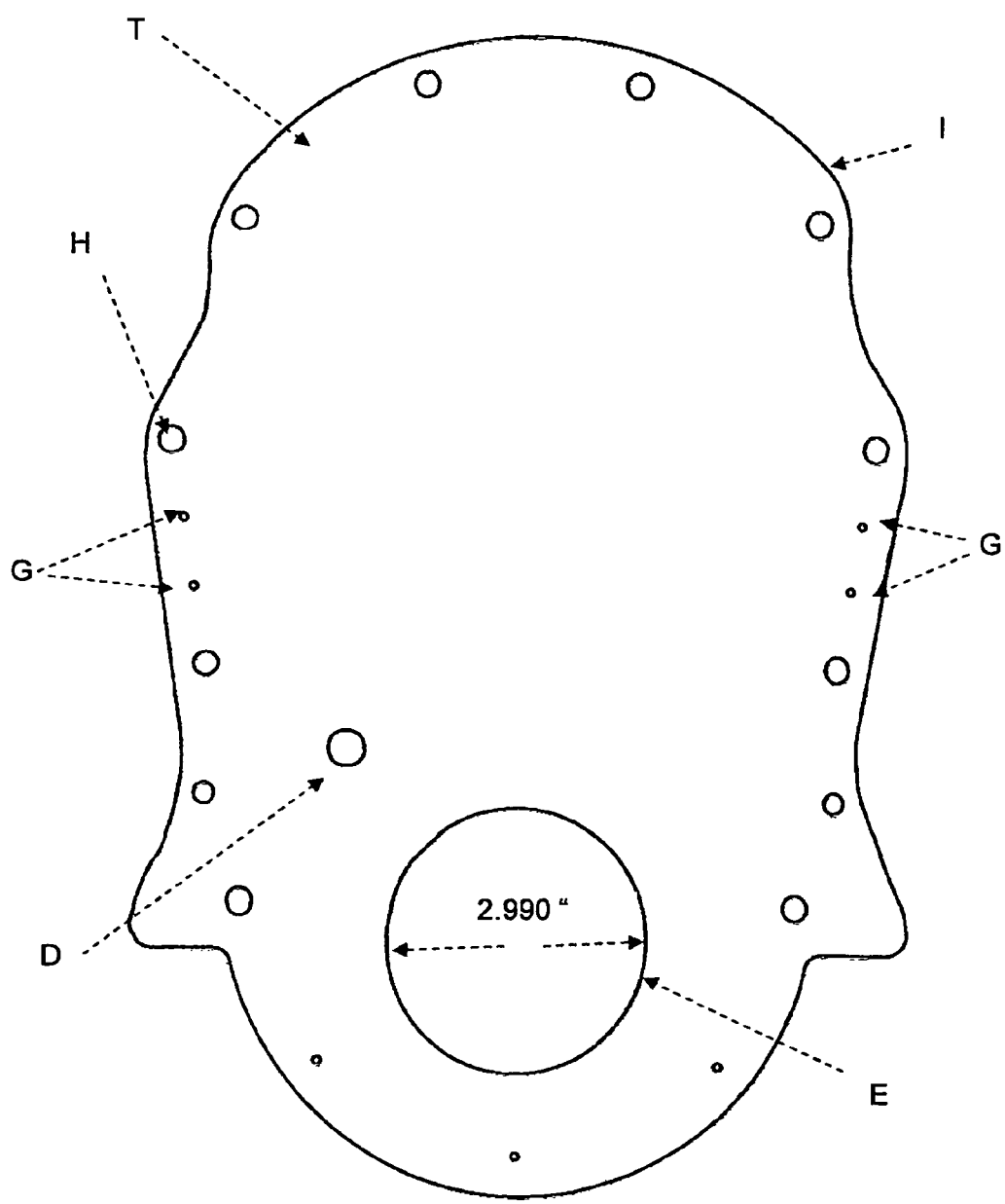
FIG. 1

T—Showing a drawing of the one part front cover, front view.

H—Showing all large hole diameters measuring 0.275 thousands of an inch through the cover.

G—Showing all small hole diameters measuring 0.100 thousands of an inch through the cover.

D—Showing shaft mounting hole diameter measuring 0.390 thousands of an inch which the hardened shaft will bolt through, and idler sprocket will slip over and spin freely.

E—Showing crank seal hole diameter measuring 2.990 inches which accepts a part Number 3945 crank seal to be pressed into it.

I—Shows cover thickness using T6-6061 aluminum measuring 0.250 thousands of an inch.

FIG. 2

C—Showing split cover two-part top front piece.

B—Showing split cover two-part bottom front piece.

F—Showing cut line thickness of 0.030 thousands of an inch separating the top part of the cover from the bottom part of the cover, which makes it a split cover.

H—Showing all large hole diameters measuring 0.275 thousands of an inch through the cover.

D—Showing shaft mounting hole diameter measuring 0.390 thousands of an inch which the hardened shaft will bolt through.

E—Showing crank seal hole diameter measuring 2.990 inches which accepts a part Number 3945 crank seal to be pressed into it.

G—Showing all small hole diameters measuring 0.100 thousands of an inch through the cover.

FIG. 3

A—Showing two and three part cover backing plate which is used for both two part and one part front covers that attach to it. The backing plate then attaches to the front of the Dart engineering engine block with the cam raised 0.600 thousandths of an inch from stock location.

I—Showing backing plate thickness. Plate is made of T6-6061 aluminum with total thickness 0.750 thousandths of an inch.

J—Showing holes in backing plate tapped to 10-24 thread size through. These holes are used for attachment bolts holding in place top half cover and bottom half cover. Total of 4 holes, 2 holes per side.

K—Showing 3 holes tapped to ¼"—20 thread size through. These holes are used for attachment bolts that hold in place bottom section of cover to the backing plate.

H—Showing all large hole diameters measuring 0.275 thousands of an inch through the cover for attachment bolts to slide through and into the engine block for fastening.

FIG. 4

A—Showing two and three part cover backing plate which is used for both two part and one part front covers that attach to it. The backing plate then attaches to the front of the Dart engineering engine block with the cam raised 0.600 thousandths of an inch from stock location.

X to Y height measurements=13 inches. X is the top and Y is the bottom of the backing plate.

Z to W width measurements=9 inches.

FIG. 5

C—Showing split cover two-part top front piece. Height measurements from point 1 to point 2=5.850 inches.

B—Showing split cover two-part bottom front piece. Height measurements from point 3 to Point 4=7.120 inches, and total width measurements from point 5 to point 6=9 inches.

FIG. 6

Figure 2:
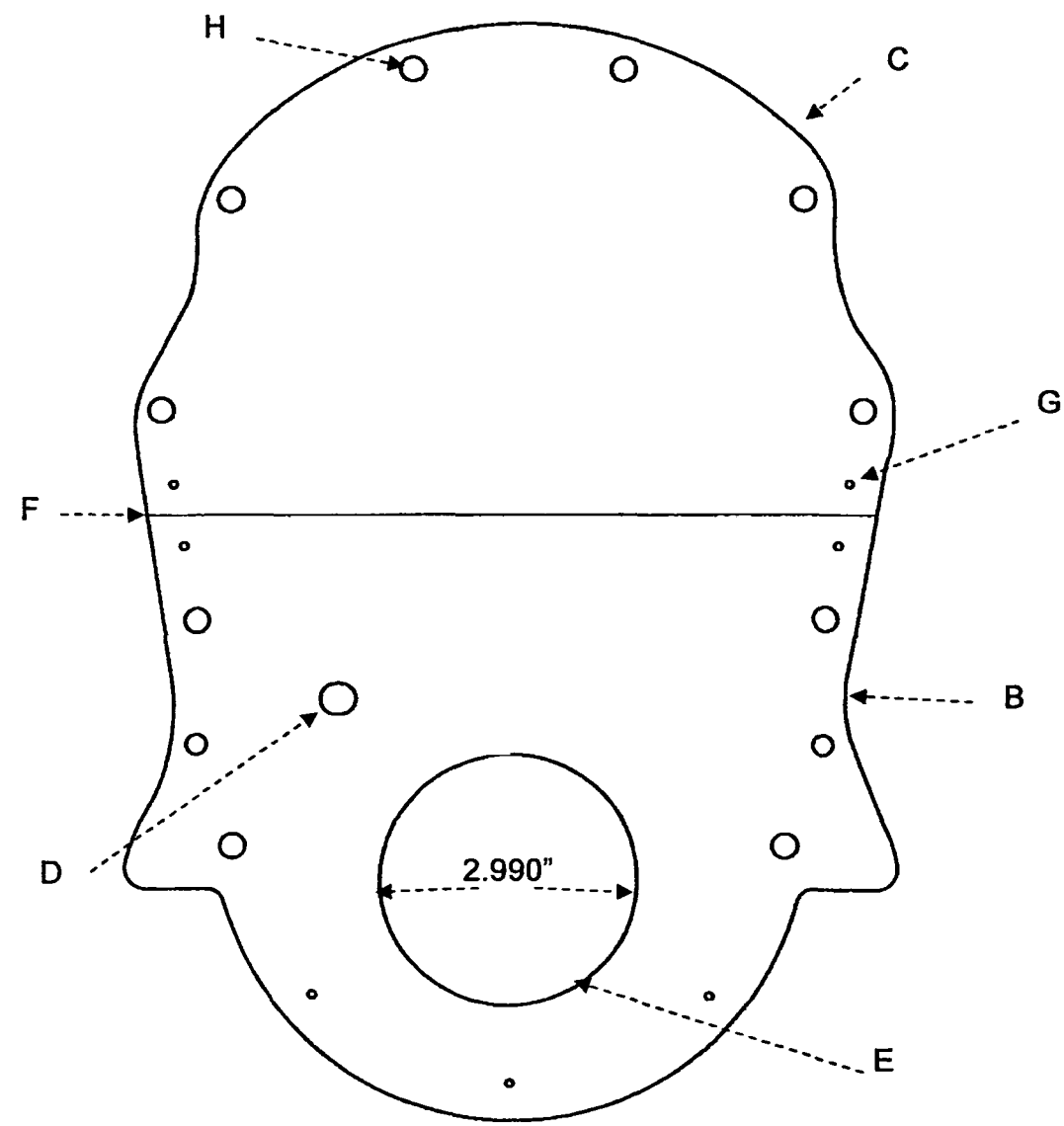
Figure 3:
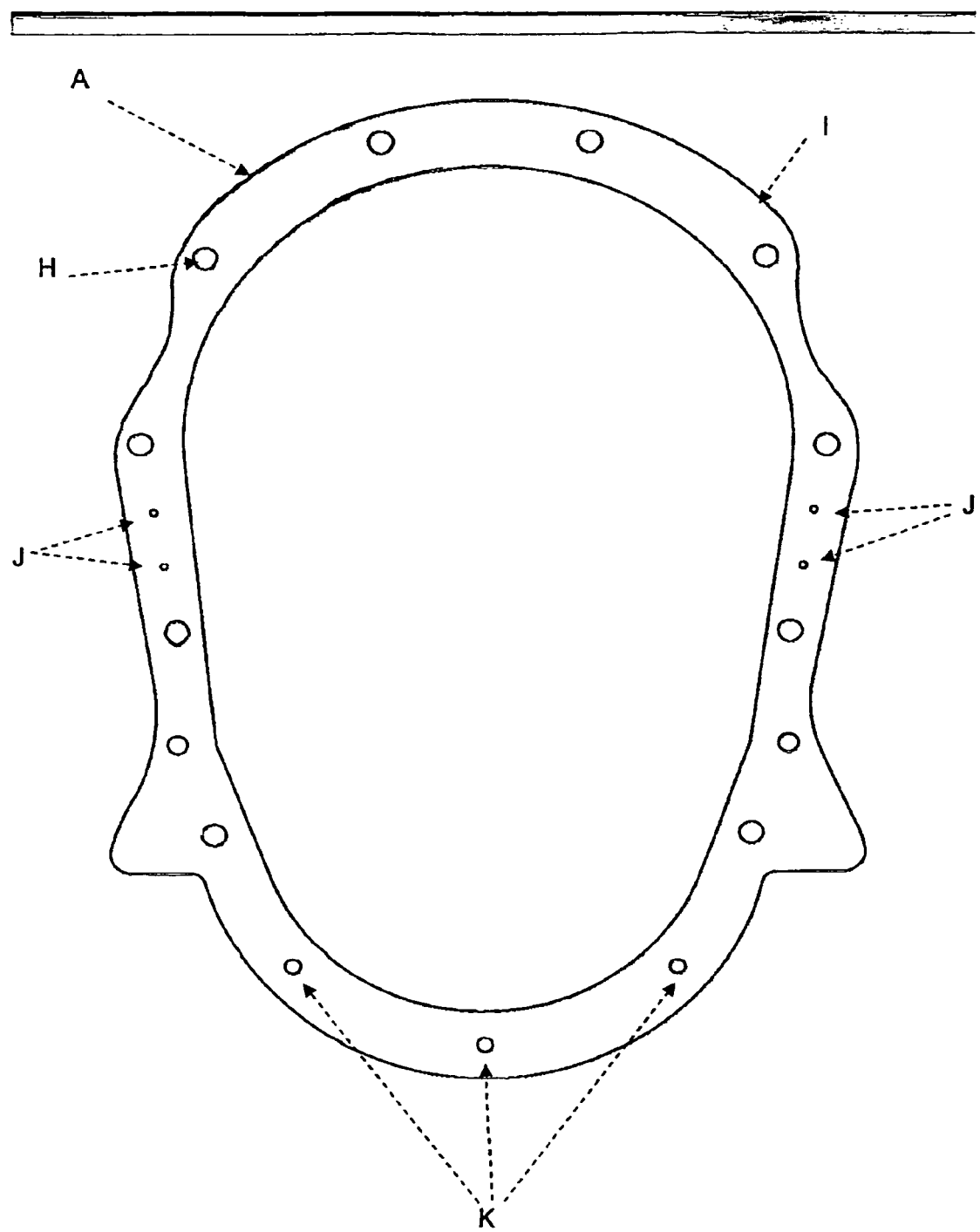
Figure 4:
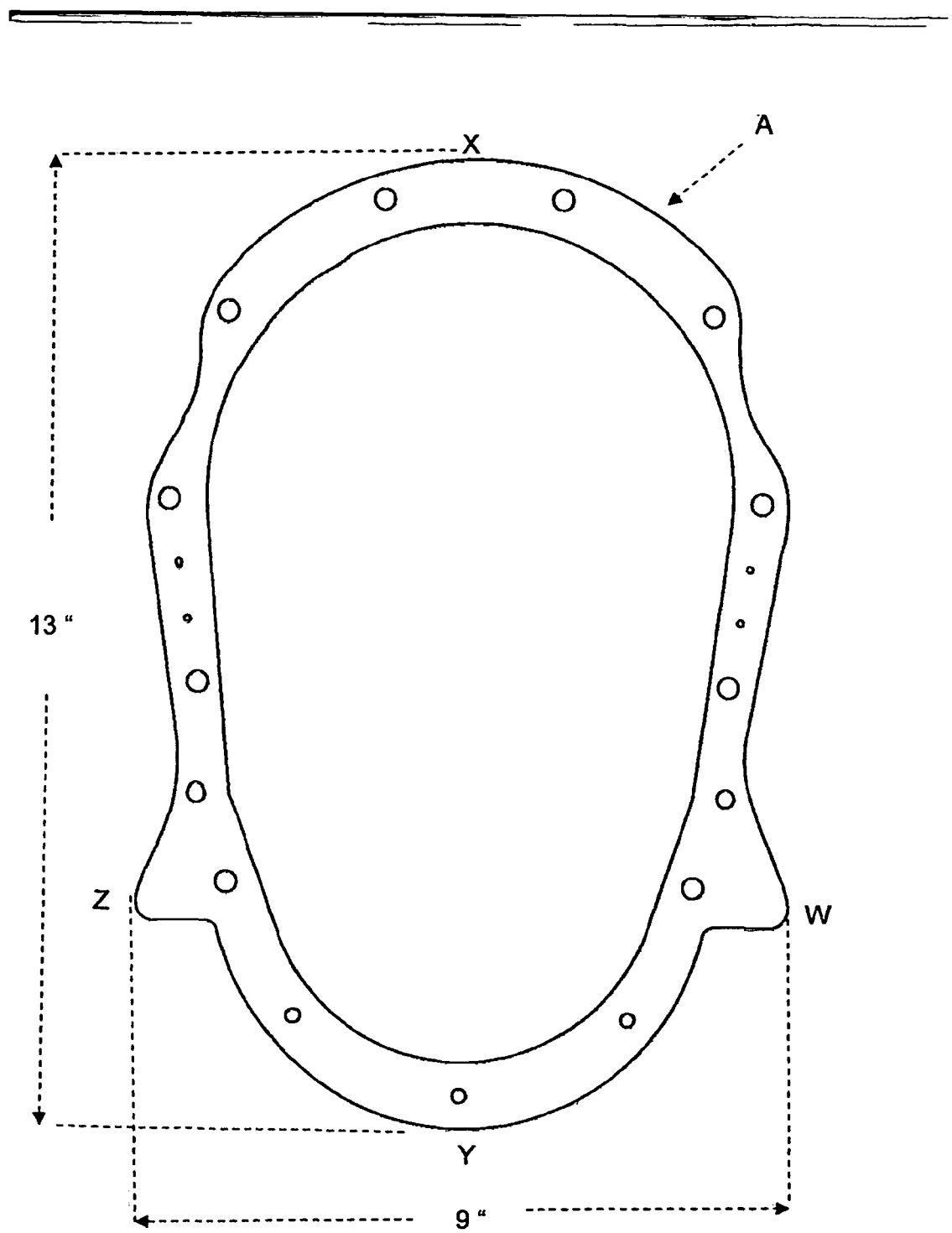
Figure 5:
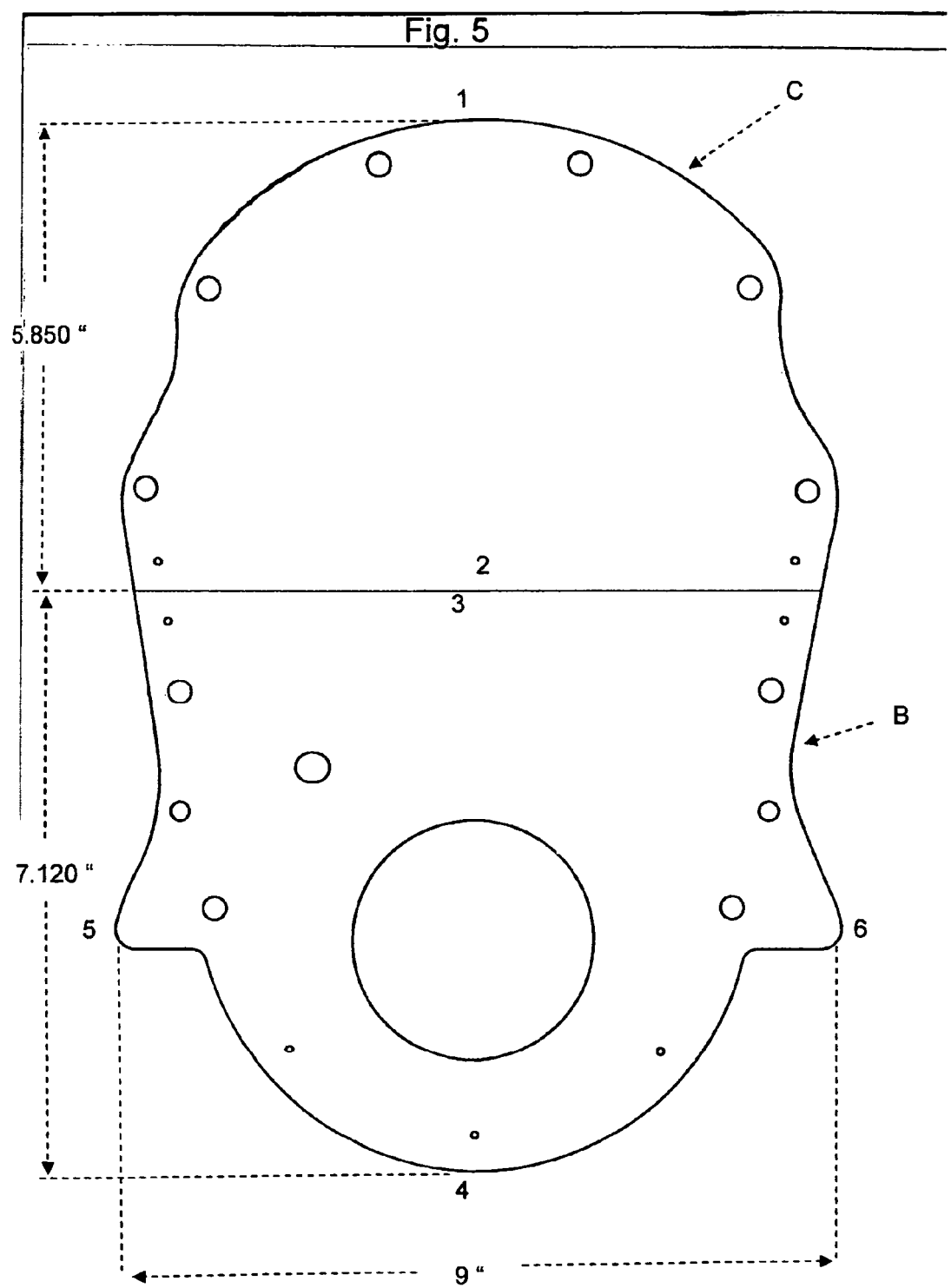
Figure 6:
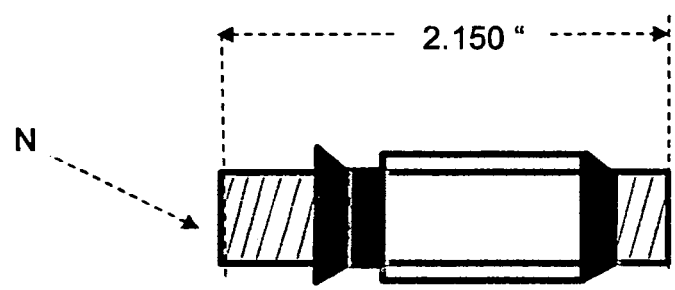
Figure 6:
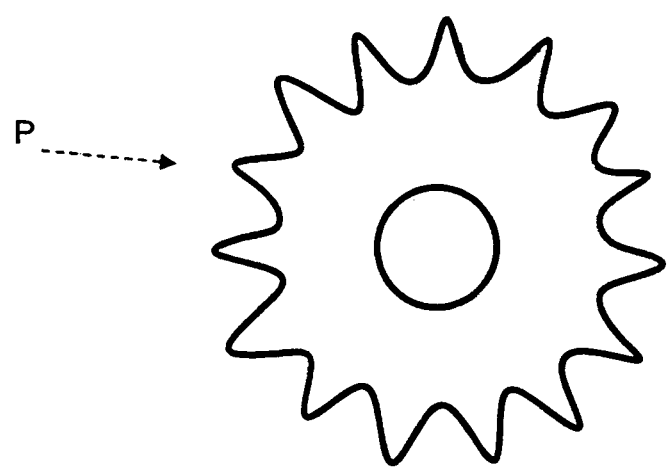
Figure 7:
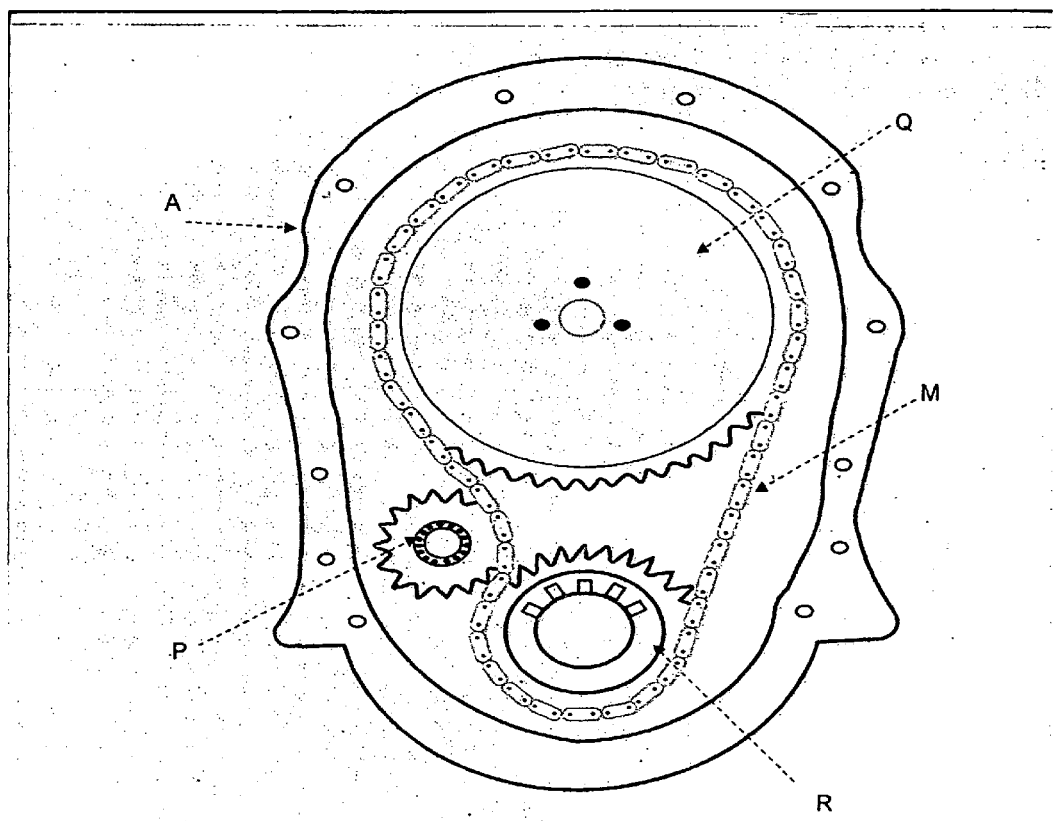

N—Showing hardened shaft with bearing race. Total length of shaft=2.150 inches. Shaft is ⅜ inch diameter, fine thread. This shaft is installed through the one part front cover, with attaching nut. Refer to FIG. 1, D. Also, split cover two part bottom refer to FIG. 2. B which is the split cover two part bottom front, and D, shaft mounting hole.

P—Showing modified idler sprocket used in this system to take up timing chain slack. This sprocket is slipped over the hardened shaft with bearing race, and will spin freely due to the caged needle bearing JH1016 pressed into it.

FIG. 7

OPERATIONAL OVERVIEW

A—Showing two and three part cover backing plate which is used for both two part and one part front covers that attach to it. The backing plate then attaches to the front of the Dart engineering engine block, with the cam raised 0.600 thousandths of an inch from stock location.

Q—Showing engine cam sprocket which attaches to the camshaft of the engine.

R—Showing crankshaft sprocket which is attached to the engine crankshaft.

M—Showing the modified 70 link double roller timing chain which wraps around the cam sprocket and crank sprocket. The idler sprocket is then positioned into the chain taking up the chain slack, as it will be rotating counterclockwise while the cam sprocket and crank sprocket will be rotating clockwise.

P—Showing modified idler sprocket with bearing, positioned into the timing chain to take up timing chain slack.

At this point, the one part front cover, or split cover bottom half will be assembled onto the backing plate with the hardened shaft and bearing race mounted into the shaft mounting hole of the front cover. The shaft will then slip into the idler sprocket.

This will hold the idler sprocket in operational position.

The cover is pushed inward and flush with the backing plate and attached with ¼" -20 thread size bolts, 1½ inches long. These bolts go through all the large bolt holes, which will anchor into the engine block holding the assembly together and fully mounting It to the engine block. At this point the system is assembled and covered, ready for operation.

The invention claimed is:

1. An automobile timing chain system for use with a non-standard cylinder block that employs an offset camshaft location, wherein the system consists of:
    (a) a non-standard cylinder block having an offset camshaft location, wherein a camshaft axis is disposed 5.752 inches from a parallel crankshaft axis;
    (b) an aluminum timing chain cover assembly disposed on the cylinder block, wherein the timing chain cover consists of a first cover component, a second cover component, and an annular back plate component, wherein the first cover component and the second cover component are each 0.250 inch thick and only interface along a single horizontal plane, wherein the first cover component and the second cover component are parallel to one another attaching only to the back plate component, wherein the back plate component is 0.750 inch thick;
    (c) a hardened idler shaft perpendicularly disposed on an inside surface of the second cover component, wherein the shaft is 2.150 inches in length, wherein two inner bearing races are disposed on the idler shaft;
    (d) an idler sprocket having an 0.874 inch sprocket bore centrally disposed therein, wherein a caged needle bearing is affixedly disposed in the sprocket bore; and
    (e) a double roller bullet timing chain, wherein the timing chain consists of 70 links;
    wherein the backing plate is disposed on a cylinder block front surface via mounting apertures and hardware, wherein a timing chain cam sprocket is disposed on a camshaft anterior end, wherein a timing chain crank sprocket is disposed on a crankshaft anterior end, wherein the idler sprocket is rotatably disposed on the idler shaft via the needle bearing and the inner bearing races, wherein the timing chain is disposed on the timing chain camshaft sprocket and the timing chain crankshaft sprocket, wherein second cover component having the idler sprocket is disposed on the back plate component, wherein the idler sprocket is interfacingly disposed against the timing chain to remove slack, wherein the first cover component is disposed on the back plate component adjacent to the second cover component to enclose the timing chain, wherein the first cover component is designed to provide rapid removal once the cover is installed on the cylinder block, wherein the timing chain system is for use with a non-standard cylinder block that employs an offset camshaft location.

2. An automobile timing chain system for use with a non-standard cylinder block that employs an offset camshaft location, wherein the system comprises of:
   (a) a non-standard cylinder block having an offset camshaft location, wherein a camshaft axis is disposed 5.752 inches from a parallel crankshaft axis;
   (b) an aluminum timing chain cover assembly disposed on the cylinder block, wherein the timing chain cover comprises of a first cover component, a second cover component, and an annular back plate component, wherein the first cover component and the second cover component are each 0.250 inch thick and only interface along a single horizontal plane, wherein the first cover component and the second cover component are parallel to one another attaching only to the back plate component, wherein the back plate component is 0.750 inch thick;
   (c) a hardened idler shaft perpendicularly disposed on an inside surface of the second cover component, wherein the shaft is 2.150 inches in length, wherein two inner bearing races are disposed on the idler shaft;
   (d) an idler sprocket having an 0.874 inch sprocket bore centrally disposed therein, wherein a caged needle bearing is affixedly disposed in the sprocket bore; and
   (e) a double roller bullet timing chain, wherein the timing chain comprises of 70 links;
wherein the backing plate is disposed on a cylinder block front surface via mounting apertures and hardware, wherein a timing chain cam sprocket is disposed on a camshaft anterior end, wherein a timing chain crank sprocket is disposed on a crankshaft anterior end, wherein the idler sprocket is rotatably disposed on the idler shaft via the needle bearing and the inner bearing races, wherein the timing chain is disposed on the timing chain camshaft sprocket and the timing chain crankshaft sprocket, wherein second cover component having the idler sprocket is disposed on the back plate component, wherein the idler sprocket is interfacingly disposed against the timing chain to remove slack, wherein the first cover component is disposed on the back plate component adjacent to the second cover component to enclose the timing chain, wherein the first cover component is designed to provide rapid removal once the cover is installed on the cylinder block, wherein the timing chain system is for use with a non-standard cylinder block that employs an offset camshaft location.

* * * * *